US009021547B1

(12) United States Patent
Lin et al.

(10) Patent No.: US 9,021,547 B1
(45) Date of Patent: Apr. 28, 2015

(54) FULLY INTEGRATED SWITCHING AND ROUTING IN A SECURITY DEVICE

(75) Inventors: Tsai-Zong Lin, Cupertino, CA (US); Chih-Wei Chao, Saratoga, CA (US); Jin Shang, Newark, CA (US); Dongyi Jiang, Milpitas, CA (US); Anchung Chung, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 604 days.

(21) Appl. No.: 13/333,439

(22) Filed: Dec. 21, 2011

(51) Int. Cl.
*G06F 17/00* (2006.01)
*G06F 7/04* (2006.01)
*H04L 29/06* (2006.01)

(52) U.S. Cl.
CPC ............... *H04L 63/20* (2013.01); *H04L 63/166* (2013.01)

(58) Field of Classification Search
USPC .................. 726/1, 26; 713/151, 166
See application file for complete search history.

(56) References Cited

U.S. PATENT DOCUMENTS

| 7,184,437 | B1 | 2/2007 | Cole et al. |
| 8,050,559 | B2 | 11/2011 | Sindhu |
| 2006/0056297 | A1 * | 3/2006 | Bryson et al. ................. 370/230 |

OTHER PUBLICATIONS

U.S. Appl. No. 12/182,619, filed Jul. 30, 2008 entitled Streamlined Packet Forwarding Using Dynamic Filters for Routing and Security in a Shared Forwarding Plane.

* cited by examiner

*Primary Examiner* — Aravind Moorthy
(74) *Attorney, Agent, or Firm* — Shumaker & Sieffert, P.A.

(57) ABSTRACT

This disclosure is directed toward an integrated switching and routing security device that provides zone-based security directly between layer two (L2) interfaces of L2 bridge domains and/or layer three (L3) interfaces of L3 routing instances within the security device. The integrated switching and routing security device supports both switching and routing functionalities for packets on L2 and L3 interfaces, and supports security within and between L2 bridge domains and L3 routing instances. The integrated switching and routing security device configures L2 security zones for one or more L2 interfaces and configures L3 security zones for one or more L3 interfaces. The integrated switching and routing security device then applies security policies to incoming packets according to the L2 security zones and/or the L3 security zones associated with the incoming interface and an outgoing interface for the packets to provide end-to-end security within the security device.

30 Claims, 10 Drawing Sheets

FULLY INTEGRATED SWITCHING AND ROUTING IN A SECURITY DEVICE

TECHNICAL FIELD

The invention relates to computer networks and, more specifically, network devices that provide security functionality within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, and these sites in turn may be geographically distributed over a wide area. As one example, each site network may include one or more local area networks (LANs) connecting the devices at the particular site. With the advent of Virtual Private Network (VPN) and Virtual Private LAN Service (VPLS) technology, enterprises can now securely share data between site networks over a public network, such as the Internet. For example, a hub or central network site may be the network at the headquarters of the enterprise, while spoke site networks are typically networks at geographically distributed branch offices, sales offices, manufacturing or distribution facilities, or other remote site of the enterprise.

Due to increasing importance of network security, it has become common for service providers to deploy security devices between each of the private site networks and the service provider network or other intermediate public networks connecting the site networks. One example of a commonly deployed security device is a firewall network device. A firewall, for example, is a dedicated or virtual device that is configured to permit or deny traffic flows based on the service provider's security policies.

Security devices, such as firewalls, can be implemented at various layers of the network stack, as specified with respect to the Open Systems Interconnection Basic Reference Model ("OSI Reference Model"). A security device includes both a security plane and a forwarding plane. The security plane provides layer three (L3) to layer seven (L7) security services to packets based on defined security policies associated with the incoming and outgoing interfaces of the security device. The forwarding plane forwards the packets between the incoming and outing interfaces based on either layer two (L2) or L3 forwarding information. For example, a forwarding plane of an L3 security device operates at the network layer, i.e., layer three of the OSI Reference Model, to restrict L3 network communications. As another example, a forwarding plane of an L2 security device operates within the second layer of the OSI Reference Model, also known as the data link layer, to restrict L2 network communications. An L3 security device may provide security features as well as packet forwarding, routing or other L3 functionality. A L2 security device may provide security features along with switching or other L2 functionality.

SUMMARY

In general, this disclosure is directed toward an integrated switching and routing security device that provides zone-based security directly between layer two (L2) interfaces of L2 bridge domains and/or layer three (L3) interfaces of L3 routing instances within the security device. The integrated switching and routing security device supports both switching and routing functionalities for packets on L2 and L3 interfaces, and supports security within and between L2 bridge domains and L3 routing instances within the security device. The techniques described in this disclosure allow zone-based security policies to be configured for each of the L2 and L3 interfaces of the security device and, thereby, enables end-to-end security within the security device.

In conventional security devices, even security devices offering both L2 and L3 security features, security zones can only be configured with respect to L3 interfaces or internal pseudo L3 interfaces used to connect L2 bridge domains to L3 routing instances within the security devices. Conventional security devices that offer both routing and switching functions, therefore, cannot provide end-to-end security to packet flows between the actual L2 interfaces of an L2 bridge domain serviced by the security device and other L2 interfaces or L3 interfaces of the security device. Unlike conventional security devices, the integrated switching and routing security device described in this disclosure configures L2 security zones associated with one or more L2 interfaces and configures L3 security zones associated with one or more L3 interfaces. The integrated switching and routing security device allows security policies to be defined and applied to incoming packets according to the L2 security zones and/or the L3 security zones associated with an incoming interface and an outgoing interface for the packets.

The techniques of configuring security zones on L2 interfaces of a security device provide end-to-end security between actual interfaces of the security device. The techniques of configuring security zones on the L2 interfaces also provide improved security granularity in the security device. The techniques enable each of the L2 interfaces of a single L2 bridge domain to be grouped into a separate security zone, as opposed to grouping all the L2 interfaces within the L2 bridge domain into the same security zone based on the pseudo L3 interface associated with the L2 bridge domain.

In one example, the disclosure is directed to a method comprising receiving packets on a plurality of interfaces of a security device, wherein the interfaces include one or more layer two (L2) interfaces and one or more layer three (L3) interfaces, configuring L2 security zones associated with one or more of the L2 interfaces of the security device, wherein the L2 interfaces comprise one or more L2 bridge domains within the security device, and configuring L3 security zones associated with one or more of the L3 interfaces of the security device, wherein the L3 interfaces are associated with at least one L3 routing instance within the security device. The method further comprises, based on the security zones associated with an incoming interface and an outgoing interface for each of the packets, providing zone-based security within the security device when forwarding the packets directly between the L2 interfaces of different ones of the L2 bridge domains and when forwarding the packets between the L2 interfaces of one of the L2 bridge domains and the L3 interfaces of the L3 routing instance.

In another example, the disclosure is directed to a security device comprising a plurality of interfaces to send and receive packets, wherein the interfaces include one or more layer two (L2) interfaces and one or more layer three (L3) interfaces, and a control unit to configure L2 security zones associated with one or more of the L2 interfaces and configure L3 security zones associated with one or more of the L3 interfaces, wherein the L2 interfaces comprise one or more L2 bridge domains within the security device, and wherein the L3 interfaces are associated with at least one L3 routing instance within the security device. The security device also includes a security service unit to, based on the security zones associated with an incoming interface and an outgoing interface for each of the packets, provide zone-based security within the security device when forwarding the packets directly between the L2 interfaces of different ones of the L2 bridge domains and when forwarding the packets between the L2 interfaces of one of the L2 bridge domains and the L3 interfaces of the L3 routing instance.

In a further example, the disclosure is directed to a computer-readable storage medium comprising program instructions to cause a processor to receive packets on a plurality of interfaces of a security device, wherein the interfaces include one or more layer two (L2) interfaces and one or more layer three (L3) interfaces, configure L2 security zones associated with one or more of the L2 interfaces of the security device, wherein the L2 interfaces comprise one or more L2 bridge domains within the security device, configure L3 security zones associated with one or more of the L3 interfaces of the security device, wherein the L3 interfaces are associated with at least one L3 routing instance within the security device, and, based on the security zones associated with an incoming interface and an outgoing interface for each of the packets, provide zone-based security within the security device when forwarding the packets directly between the L2 interfaces of different ones of the L2 bridge domains and when forwarding the packets between the L2 interfaces of one of the L2 bridge domains and the L3 interfaces of the L3 routing instance.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
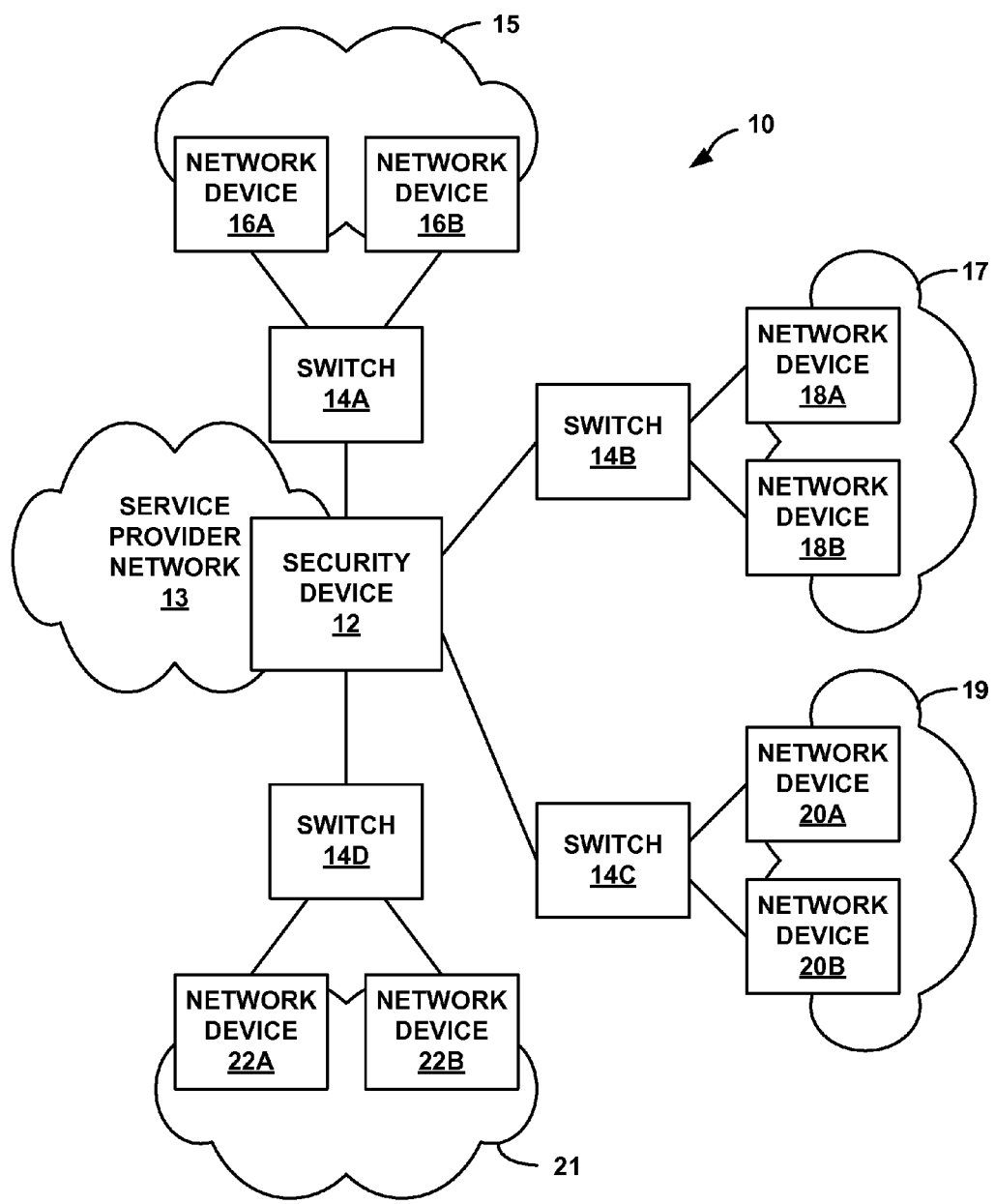
FIG. 1 is a block diagram illustrating an example network environment in which an integrated switching and routing security device is configured to provide zone-based security directly between layer two (L2) interfaces of L2 bridge domains and/or layer three (L3) interfaces of L3 routing instances within security device 12.

FIG. 1 is a block diagram illustrating an example network environment 10 in which an integrated switching and routing security device 12 is configured to provide zone-based security directly between layer two (L2) interfaces of L2 bridge domains and/or layer three (L3) interfaces of L3 routing instances within security device 12. According to the techniques described in this disclosure, security device 12 configures zone-based security policies on each of the L2 interfaces and L3 interfaces of security device 12, even in situations where two or more of the L2 interfaces are within an L2 bridge domain with an associated internal pseudo L3 interface. In this way, the techniques enable end-to-end security within security device 12 between network sites 15, 17, 19 and/or 21. In the example of FIG. 1, security device 12 is included in a service provider network 13. For example, security device 12 may comprise a provider edge (PE) router of service provider network 13 capable of performing both L2 switching and L3 routing with an integrated security service unit, e.g., a firewall.

Each of network sites 15, 17, 19 and 21 may include a number of client devices, such as computers, connected via one or more local area networks (LANs) at the particular site. In the case of an enterprise network, the client devices at one or more of network sites 15, 17, 19 and 21 may be owned or administered by a single enterprise, and network sites 15, 17, 19 and 21 may be geographically distributed over a wide area. In order for the client devices of the enterprise to securely share data between site networks 15, 17, 19 and/or 21 over a public network, such as the Internet, service provider network 13 may utilize Virtual Private Network (VPN) or Virtual Private LAN Service (VPLS) technology. For example, network sites 15, 17, 19 and 21 may comprise VPN sites and/or VPLS sites. One of the network sites, e.g., network site 15, may comprise a hub or central network that operates as the network at the headquarters of the enterprise, while the remaining network sites comprise spoke site networks that operate as the networks at geographically distributed branch offices, sales offices, manufacturing or distribution facilities, or other remote sites of the enterprise.

Each of network sites 15, 17, 19 and 21 include one or more network devices, e.g., routers, that connect to security device 12 via one of switches 14A-14D ("switches 14"). As illustrated in FIG. 1, network site 15 includes network devices 16A-16B ("network devices 16"), network site 17 includes network devices 18A-18B, network site 19 includes network devices 20A-20B ("network devices 20"), and network site 21 includes network devices 22A-22B ("network devices 22"). Each of network devices 16, 18, 20 and 22 may comprise customer edge (CE) routers.

Switches 14 are L2 switches that couple network devices 16, 18, 20 and 22 in network sites 15, 17, 18 and 21, respectively, to security device 12 in service provider network 13. As L2 switches, switches 14 initially broadcast all L2 packets to all ports, thereby providing L2 connectivity. As L2 devices, switches 14 typically "learn" of other L2 devices coupled to each port and maintain state information to reflect this learning. For example, over time, switch 14A receives L2 communications from directly connected network devices 16 within network site 15, and learns particular destination Media Access Control (MAC) addresses of devices directly downstream from each port including the MAC address of security device 12.

Although not shown in FIG. 1, service provider network 13 generally includes a set of PE routers at the edge of the network interconnected with internal routers and other network devices via high-speed network links. For example, security device 12 and any other PE routers of service provider network 13 may execute one or more routing protocols including Interior Gateway Protocols (IGPs), such as Intermediate System to Intermediate System (ISIS), and/or an Exterior Gateway Protocols (EGPs), such as Border Gateway Protocol (BGP), for distributing routing information.

As described in this disclosure, security device 12 includes both L2 switch functionality and L3 routing functionality to securely transport communications of network sites 15, 17, 19 and 21 through service provider network 13 and possibly other public networks, such as the Internet. In general, security devices are an increasingly important component in a modern network environment, such as network environment 10. Security devices, such as integrated switching and routing security device 12, include two major components: a forwarding plane and a security plane. The forwarding plane performs packet forwarding based on forwarding information that includes a L2 MAC table and/or a L3 routing table. The security plane performs L3 to L7 security control based on security policies configured by the service provider. The security policies may define specific actions to be applied to packets within security device 12. Example actions including packet filtering, packet logging, intrusion detection and prevention (IDP), virus scanning, virtual private network (VPN), network address translation (NAT), application-level gateway (ALG), deep packet inspection, policy-based authentication, and the like.

Different types of security devices may address different network requirements. In one example, a security device may comprise a routing-based security device with a security plane that provides a full-set of L3 to L7 security features and a forwarding plane that operates as a L3 router based on L3 packet headers. The L3 security device may be referred to as a route-mode security device that is viewed as a next hop by other network devices in network environment 10. In this example, all the interfaces of the L3 security device are L3 interfaces with L3 addresses configured on the L3 interfaces. Each of the L3 interfaces connects to a separate L3 domain that includes one or more network devices. One or more of the L3 interfaces may be grouped together into one security zone, and the network devices connected to each of the grouped L3 interfaces belong to the associated security zone. The service provider may configure security policies for the L3 security device to apply to packets routed from L3 interfaces in one security zone to L3 interfaces in another security zone. The packets will be forwarded only if the applied security policy permits the packet. In this case, the security policies are only applied to those packets routed between different L3 domains by the L3 security device. The security policies are not applied to packets switched by L2 switches, e.g., switches 14, within a same L3 domain.

In another example, a security device may comprise a switching-based security device with a security plane that provides a full-set of L3 to L7 security features and a forwarding plane that operates as a L2 switch based on L2 packet headers. The L2 security device may be referred to as a transparent-mode security device. The L2 security device is not viewed as a next hop and does not affect any L3 routing configuration changes in network environment 10. In this example, all the interfaces of the L2 security device are L2 interfaces with no L3 addresses configured on the L2 interfaces. One or more of the L2 interfaces connect to a single L2 domain that includes one or more network devices. In some cases, a pseudo L3 interface may be configured for each L2 domain, and L3 addresses may be configured on the pseudo L3 interfaces. The pseudo L3 interfaces are used for management, and not used to route packets.

One or more of the L2 interfaces of the L2 security device may be grouped together into one security zone, and the network devices connected to each of the grouped L2 interfaces belong to the associated security zone. In some cases, the L2 interfaces connected to the same L2 domain may be grouped into different security zones. The service provider may configure security policies for the L2 security device to apply to packets switched from L2 interfaces in one security zone to L2 interfaces in another security zone within the same L2 domain. The packets will be forwarded only if the applied security policy permits the packet. In this case, the security policies are only applied to those packets switched within the same L2 domain by the L2 security device. The L2 security device is not capable of switching packets between different L2 domains.

Routing-based and switching-based security devices may be useful in some network environment deployments to meet the network and security requirements, but security can only be applied either between different L3 domains or within L2 domains. The L2 or L3 security devices cannot apply security between a L3 domain and a L2 domain, or between different L2 domains.

In an additional example, a security device may support both L2 interfaces and L3 interfaces. The L2 interfaces connect to one or more L2 bridge domains within the security device and the L3 interfaces connect to a L3 routing instance within the security device. Each of the L2 bridge domains connect to the L3 routing instance through a pseudo L3 interface. The L2/L3 security device, however, can only apply security between the L3 interfaces and the pseudo L3 interfaces connected to the L3 routing instance.

Although the L2/L3 security device supports both routing and switching, security is only applied on packets routed between and/or pseudo L3 interfaces, and not on packets switched between L2 interfaces. In this case, the service provider can only configure security policies on the L3 interfaces and the pseudo L3 interfaces, and not on individual L2 interfaces. The L2/L3 security device, therefore, does not provide end-to-end security control for packets forwarded within the same L2 bridge domain, between different L2 bridge domains, or between a L2 bridge domain and a L3 routing instance. This conventional L2/L3 security device is described in more detail with respect to FIGS. 2 and 3.

According to the techniques described in this disclosure, integrated routing and switching security device 12 provides end-to-end security between L2 interfaces and/or L3 interfaces of security device 12. Integrated switching and routing security device 12 supports switching and routing of packets between L2 and L3 interfaces, and supports security within and between L2 bridge domains and L3 routing instances.

More specifically, security device 12 supports both L2 and L3 interfaces used to connect to network devices 16, 18, 20 and 22 within network sites 15, 17, 19 and 21, respectively, via switches 14. For example, security device 12 may connect to network devices 16 in network site 15 and network devices 18 in network site 17 via L2 interfaces. In addition, security device 12 may connect to network devices 20 in network site 19 and network devices 22 in network site 21 via L3 interfaces. Security device 12, therefore, supports both L2 switching functionalities and L3 routing functionalities to move packets between network sites 15, 17, 19 and 21 via the L2 and L3 interfaces.

Security device 12 also includes an integrated security service unit, which may include a firewall. The security service unit is configured to permit or deny traffic flows based on security policies established by the service provider. According to the techniques described in this disclosure, the security service unit includes both an L2 security unit and an L3 security unit that allows security device 12 to apply security policies to packets flowing between L2 interfaces and/or L3 interfaces.

Further, the security service unit allows zone-based security policies to be configured for the different interfaces of security device 12. More specifically, the security service unit configures L2 security zones associated with one or more L2 interfaces and configures L3 security zones associated with one or more L3 interfaces. The service provider may then configure security policies with respect to the L2 and L3 security zones of the L2 and L3 interfaces between which packets may be passed, i.e., incoming and outgoing interfaces. In this way, the security service unit enables security device 12 to apply security policies at the points where traffic enters and exits security device 12, whether on L2 interfaces or L3 interfaces.

Integrated switching and routing security device 12 applies security policies to incoming packets according to the L2 security zones and/or the L3 security zones associated with an incoming interface and an outgoing interface for the packets. The techniques of configuring security zones on both L2 and L3 interfaces provide end-to-end security in security device 12. The techniques of configuring security zones on both L2 and L3 interfaces also provide improved security granularity in security device 12. The techniques enable each of the L2 interfaces to be grouped into a separate security zone, as opposed to grouping all the L2 interfaces within the same L2 bridge domain into the same security zone based on the pseudo L3 interface.

Figure 2:
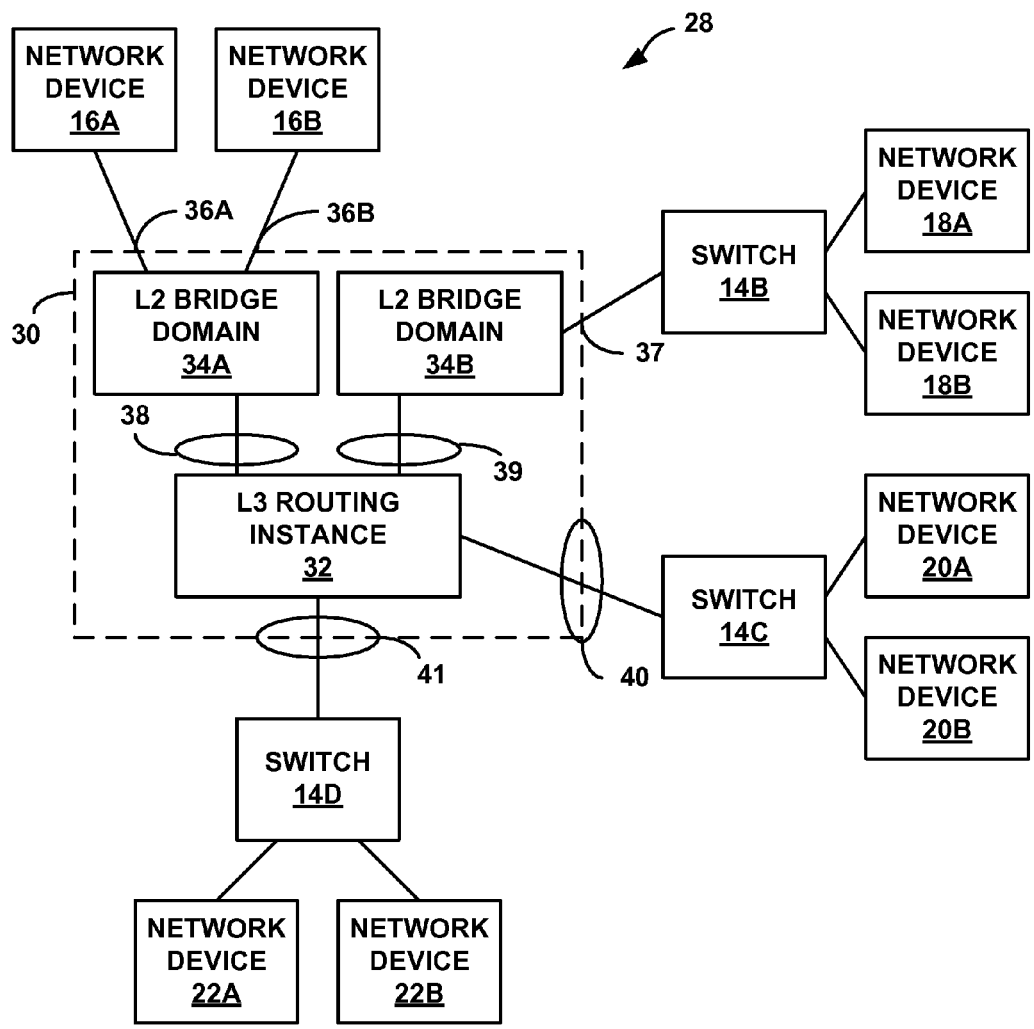
FIG. 2 is a block diagram illustrating a conventional security device within a network environment.

FIG. 2 is a block diagram illustrating a conventional L2/L3 security device 30 within a network environment 28. Network environment 28 may be substantially similar to network environment 10 from FIG. 1. As illustrated in FIG. 2, network environment 28 includes network devices 16 connected directly to conventional security device 30, and network devices 18, 20 and 22 connected to conventional security device 30 via switches 14. Network devices 16, 18, 20 and 22 and switches 14 operate as described in FIG. 1. For example, although not illustrated in FIG. 2, each of network devices 16, 18, 20 and 22 may be included in network sites 15, 17, 19 and 21, respectively, from FIG. 1. In addition, conventional security device 30 may be included in a service provider network, such as service provider network 13 from FIG. 1.

In the example of FIG. 2, conventional security device 30 supports both L2 interfaces and L3 interfaces. Conventional security device 30 includes L2 bridge domains 34A-34B ("L2 bridge domains 34") and L3 routing instance 32. L2 interfaces 36A and 36B connect to first L2 bridge domain 34A and L2 interface 37 connects to second L2 bridge domain 34B. L3 interfaces 40 and 41 connect to L3 routing instance 32. First L2 bridge domain 34A is connected to L3 routing instance 32 through a pseudo L3 interface 38, and second L2 bridge domain 34B is connected to L3 routing instance 32 through a pseudo L3 interface 39. In other examples, conventional security device 30 may include more than one L3 routing instance and more or fewer L2 bridge domains.

As illustrated in FIG. 2, network devices 16 connect directly to first L2 bridge domain 34A on L2 interfaces 36A and 36B ("L2 interfaces 36"). Network devices 18 connect to second L2 bridge domain 34B via switch 14B on L2 interface 37. Network devices 20 and network devices 22 connect to L3 routing instance 32 via switches 14C and 14D on L3 interfaces 40, 41, respectively. Conventional security device 30 supports switching of packets between L2 interfaces within each of L2 bridge domains 34. Conventional security device 30 also supports routing of packets between the L3 interfaces and/or the L2 interfaces through L3 routing instance 32. Conventional security device 30, however, only applies security to packets passed between the interfaces connected to L3 routing instance 32, indicated with circles in FIG. 2. Conventional security device 30 cannot provide end-to-end security control for packets forwarded within the same L2 bridge domain 34A or 34B, between different L2 bridge domains 34A and 34B, or between L2 bridge domain 34A or 34B and L3 routing instance 32.

Conventional security device 30 configures L3 security zones associated with one or more of L3 interfaces 40, 41 and pseudo L3 interfaces 38, 39. Security policies are configured with respect to the L3 security zones of the L3 interfaces between which packets may be passed. Conventional security device 30 then applies the security policies to packets passed between L3 interfaces 40, 41 and pseudo L3 interfaces 38, 39 according to the L3 security zones associated with the interfaces.

The L3 security zones may be formed with per L3 interface granularity. For example, L3 interface 40 connected to network devices 20 may be grouped into one L3 security zone. L3 interface 41 connected to network devices 22 may be grouped into another L3 security zone. Pseudo L3 interface 39 connected to network devices 18 via L2 bridge domain 34B may be grouped into another L3 security zone. In addition, pseudo L3 interface 38 connected to network devices 16 via L2 bridge domain 34A may be grouped into another L3 security zone. In the last case, even though each of network devices 16 is directly connected to L2 bridge domain 34A via an individual one of L2 interfaces 36, both of network devices 16 must be included in the same L3 security zone because the security zones are configured on the pseudo L3 interfaces 38 and not on the L2 interfaces 36.

As one example, conventional security device 30 may receive a packet on L2 interface 36A to be switched within L2 bridge domain 34A for output on L2 interface 36B. Conventional security device 30 does not apply any security to the switched packets because no security zones, or related security policies, are associated with the L2 interfaces 36. As another example, conventional security device 30 may receive a packet on one of L2 interfaces 36 to be routed from first L2 bridge domain 34A through L3 routing instance 32 to second L2 bridge domain 34B for output on L2 interface 37. In this case, conventional security device 30 only applies security to the packets passed between pseudo L3 interface 38 and pseudo L3 interface 39 through L3 routing instance 32.

As a further example, conventional security device 30 may receive a packet on one of L2 interfaces 36 to be routed from first L2 bridge domain 34A through L3 routing instance 32 for output on one of L3 interfaces 40 and 41. In this case, conventional security device 30 only applies security to the packets passed between pseudo L3 interface 38 and one of L3 interfaces 40, 41 through L3 routing instance 32. As another example, conventional security device 30 may receive a packet on one of L3 interfaces 40, 41 to be routed through L3 routing instance 32 to first L2 bridge domain 34A for output on one of L2 interfaces 36. In this case, conventional security device 30 only applies security to the packets passed between one of L3 interfaces 40, 41 and pseudo L3 interface 38 through L3 routing instance 32. In any of the above examples, conventional security device 30 does not provide end-to-end security because no security zones, or related security policies, are configured on L2 interfaces 36, 37.

Figure 3:
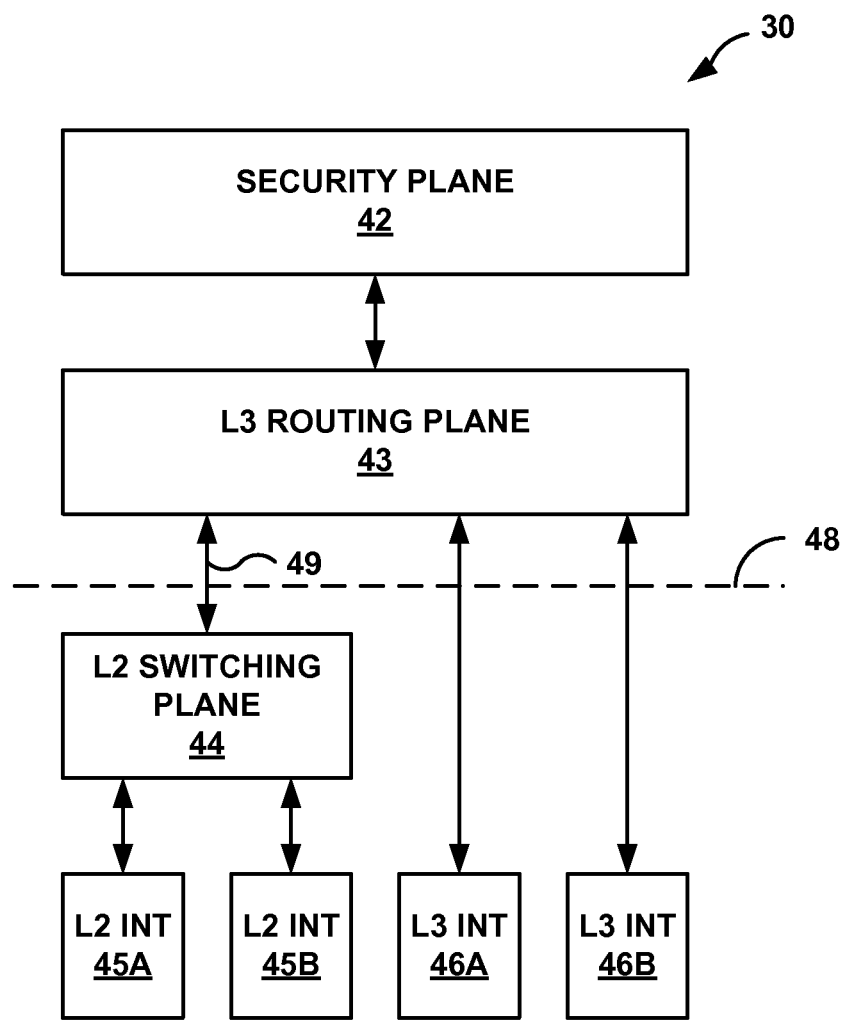
FIG. 3 is a logical diagram illustrating passing of only layer three (L3) traffic to a security plane in a conventional security device.

FIG. 3 is a logical diagram illustrating passing of only L3 traffic to a security plane 42 in conventional security device 30. In general, FIG. 3 illustrates different planes of operation within conventional security device 30 with respect to movement of packets through conventional security device 30. In the example illustrated in FIG. 3, conventional security device 30 includes security plane 42, L3 routing plane 43, L2 switching plane 44, L2 interfaces 45A-45B ("L2 INTs 45") connected to L2 switching plane 44, and L3 interfaces 46A-46B ("L3 INTs 46") connected to L3 routing plane 43. L2 switching plane 44 is connected to L3 routing plane 43 via a pseudo L3 interface 49.

As described above, conventional security device 30 supports both switching and routing of packets, but only applies security to packets passed to L3 routing plane 43, i.e., packets that cross line 48 in FIG. 3. Conventional security device 30 switches packets between L2 INTs 45 within L2 switching plane 44, but the switched packets are not passed up to security plane 42 through L3 routing plane 43 for processing. Conventional security device 30, therefore, performs no security control for the switched packets.

Conventional security device 30 also routes packets between L3 INTs 46 and/or L2 INTs 45 though L3 routing plane 43 and via pseudo L3 interface 49. Only the packets passed to L3 routing plane 43, i.e., packets that cross line 48, are passed up to security plane 42 for processing according to an associated security policy. The security policy is applied based on the L3 interfaces that cross line 48. In this case, security plane 42 within conventional security device 30 only applies security to packets passed between L3 INTs 46 and pseudo L3 interface 49. Conventional security device 30, therefore, performs no security control for the packets passed between L2 INTs 45 and does not perform end-to-end security control for packets passed between pseudo L3 interface 49 and L2 INTs 45.

Figure 4:
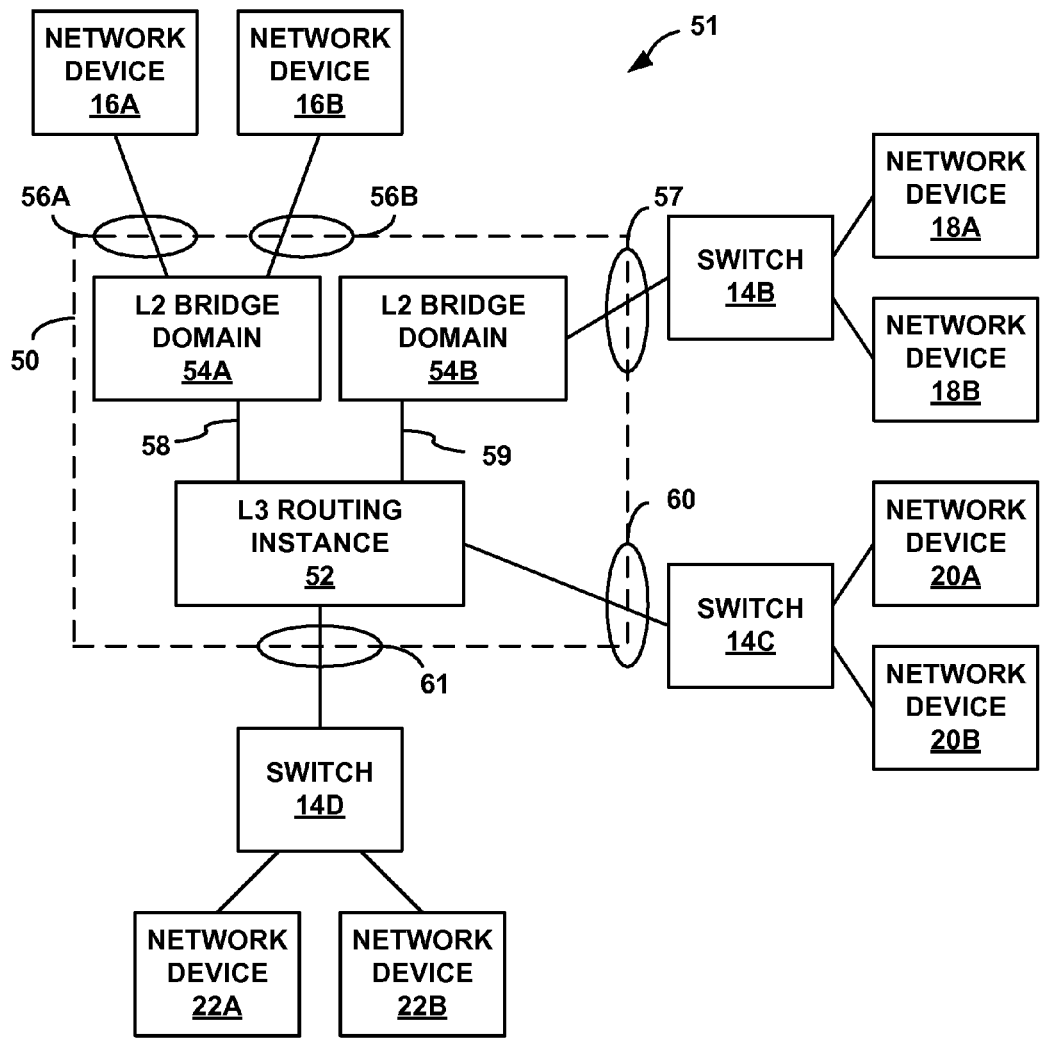
FIG. 4 is a block diagram illustrating in an exemplary integrated switching and routing security device within a network environment that operates in accordance with the principles of the invention.

FIG. 4 is a block diagram illustrating an exemplary integrated switching and routing security device 50 within a network environment 51 that operates in accordance with the principles of the invention. Security device 50 may operate substantially similar to integrated switching and routing security device 12 from FIG. 1. In addition, network environment 51 may be substantially similar to network environment 10 from FIG. 1. As illustrated in FIG. 4, network environment 51 includes network devices 16 connected directly to security device 50, and network devices 18, 20 and 22 connected to security device 50 via switches 14. Network devices 16, 18, 20 and 22 and switches 14 operate as described in FIG. 1. For example, although not illustrated in FIG. 4, each of network devices 16, 18, 20 and 22 may be included in network sites 15, 17, 19 and 21, respectively, from FIG. 1. In addition, security device 50 may be included in a service provider network, such as service provider network 13 from FIG. 1.

In the example of FIG. 4, integrated switching and routing security device 50 supports both L2 interfaces and L3 interfaces and provides end-to-end security between all of the interfaces. Security device 50 includes L2 bridge domains 54A-54B ("L2 bridge domains 54") and L3 routing instance 52. Each of the L2 interfaces of security device 50 connects to one of L2 bridge domains 54A and 54B that include one or more network devices. More specifically, L2 interfaces 56A and 56B connect to first L2 bridge domain 54A that includes network devices 16. L2 interface 57 connects to second L2 bridge domain 54B that includes network device 18. Each of the L3 interfaces of security device 50 connects to a separate L3 domain that includes one or more network devices. L3 interfaces 60 and 61 both connect to L3 routing instance 52, but may connect to separate L3 domains, e.g., a first L3 domain including network devices 20 and a second L3 domain including network devices 22.

First L2 bridge domain 54A is connected to L3 routing instance 52 through a pseudo L3 interface 58, and second L2 bridge domain 54B is connected to L3 routing instance 52 through a pseudo L3 interface 59. In other examples, security device 50 may include more than one L3 routing instance and more or fewer L2 bridge domains. As illustrated in FIG. 4, network devices 16 connect directly to first L2 bridge domain 54A on L2 interfaces 56A and 56B ("L2 interfaces 56"). Network devices 18 connect to second L2 bridge domain 54B via switch 14B on L2 interface 57. Network devices 20 and network devices 22 connect to L3 routing instance 52 via switches 14C and 14D on L3 interfaces 60, 61, respectively.

Integrated switching and routing security device 50 supports switching of packets between L2 interfaces within each of L2 bridge domains 54. Security device 50 also supports routing of packets between the L3 interfaces and/or the L2 interfaces through L3 routing instance 52. In accordance with the techniques described in this disclosure, security device 50 applies security to packets passed between all the interfaces of security device 50, including both the L2 interfaces and the L3 interfaces indicated with circles in FIG. 4. Integrated switching and routing security device 50, therefore, provides end-to-end security control for packets forwarded within the same L2 bridge domain 54A or 54B, between different L2 bridge domains 54A and 54B, within L3 routing instance 52, and between L2 bridge domain 54A or 54B and L3 routing instance 52.

Integrated switching and routing security device 50 configures L2 security zones associated with one or more of L2 interfaces 56, 57 and configures L3 security zones associated with one or more of L3 interfaces 60, 61. Security policies are configured with respect to the L2 and L3 security zones of the L2 and L3 interfaces between which packets may be passed. Security device 50 then applies the security policies to packets passed between L2 interfaces 56, 57 and/or L3 interfaces 60, 61 according to the L2 and L3 security zones associated with the incoming and outgoing interfaces. In this way, security device 50 applies security policies at the point where traffic enters or exits security device 50, whether on L2 interfaces 56, 57 or L3 interfaces 60, 61. In some cases, security device 50 does not configure any security zones associated with pseudo L3 interfaces 58 or 59, but only configures security zones for actual L2 interfaces 56, 57 and L3 interfaces 60, 61 of security device 50. In other cases, security device 50 may also be able to configure security zones for pseudo L3 interfaces 58, 59.

Both the L2 and L3 security zones may be formed with per interface granularity. For example, L3 interface 60 connected to network devices 20 may be grouped into one L3 security zone. L3 interface 61 connected to network devices 22 may be grouped into another L3 security zone. As another example, security device 50 may configure a single L3 security zone associated with both L3 interfaces 60 and 61 such that network devices 20 and 22 are grouped into the same security zone.

Unlike a conventional security device, such as security device 30 from FIGS. 2 and 3, integrated switching and routing security device 50 configures L2 security zones associated with one or more of L2 interfaces 56, 57. In this way, the L2 security zones may be formed with per L2 interface granularity. The techniques of this disclosure, therefore, not only provide end-to-end security in security device 50, but also provide improved security granularity in security device 50. The techniques enable each of L2 interfaces 56, 57 to be grouped into a separate L2 security zone, as opposed to conventional techniques that group all the L2 interfaces within the same L2 bridge domain into the same security zone based on the pseudo L3 interface.

For example, L2 interface 56A connected to network device 16A may be grouped into one security zone, and L2 interface 56B connected to network device 16B may be grouped into a separate security zone. L2 interface 57 connected to network devices 18 may be grouped into yet another security zone. As another example, security device 50 may configure a single L2 security zone associated with two or more of L2 interfaces 56 and 57 such that at least some of network devices 16 and 18 are grouped into the same security zone.

As one example, according to the techniques, security device 50 may receive a packet on L2 interface 56A to be switched within L2 bridge domain 54A for output on L2 interface 56B. Security device 50 applies security to the switched packets between incoming L2 interface 56A and outgoing L2 interface 56B. As another example, security device 50 may receive a packet on one of L2 interfaces 56 to be routed from first L2 bridge domain 54A through L3 routing instance 52 to second L2 bridge domain 54B for output on L2 interface 57. In this case, security device 50 applies end-to-end security to the packets passed between incoming L2 interface 56A or 56B and outgoing L2 interface 57.

As a further example, security device 50 may receive a packet on one of L2 interfaces 56 to be routed from first L2 bridge domain 54A through L3 routing instance 52 for output on one of L3 interface 60 and 61. In this case, security device 50 applies end-to-end security to the packets passed between incoming L2 interface 56A or 56B and outgoing L3 interface 60 or 61. As another example, security device 50 may receive a packet on one of L3 interfaces 60, 61 to be routed through L3 routing instance 52 to L2 bridge domain 54A for output on one of L2 interfaces 56. In this case, security device 50 applies end-to-end security to the packets passed between incoming L3 interface 60 or 61 and outgoing L2 interface 56A or 56B. As another example, security device 50 may receive a packet on L3 interface 61 to be routed within L3 routing instance 52 for output on L3 interface 60. In this case, security device 50 applies end-to-end security to the packets passed between incoming L3 interface 61 and outgoing L3 interface 60.

According to the techniques of this disclosure, security device 50 configures security zones associated only with interfaces, whether L2 or L3 interfaces, and does not configure security zones associated with pseudo L3 interfaces. Security device 50 does, however, configure L3 features, such as NAT or Internet Protocol Security (IPSec) VPN, on both L3 interfaces 60, 61 and pseudo L3 interfaces 58, 59.

Figure 5:
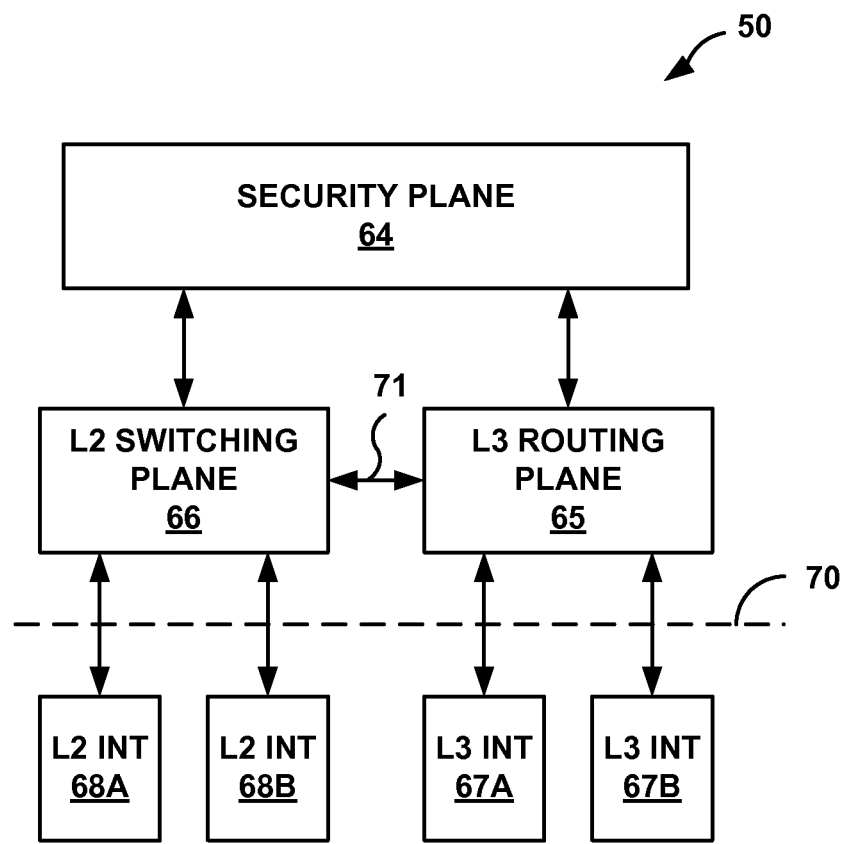
FIG. 5 is a logical diagram illustrating passing of both layer two (L2) and L3 traffic to a security plane in the integrated switching and routing security device.

FIG. 5 is a logical diagram illustrating passing of both L2 and L3 traffic to a security plane 64 in integrated switching and routing security device 50. In general, FIG. 5 illustrates different planes of operation within security device 50 with respect to movement of packets through security device 50. In the example illustrated in FIG. 5, security device 50 includes security plane 64, L3 routing plane 65, L2 switching plane 66, L3 interfaces 67A-67B ("L3 INTs 67") connected to L3 routing plane 65, and L2 interfaces 68A-68B ("L2 INTs 68") connected to L2 switching plane 66. L2 switching plane 66 is connected to L3 routing plane 65 via a pseudo L3 interface 71.

As described above, integrated switching and routing security device 50 supports both switching and routing of packets, and applies security to all packets passed to either L2 switching plane 66 or L3 routing plane 65, i.e., packets that cross line 70 in FIG. 5. Security device 50 switches packets between L2 INTs 68 within L2 switching plane 66, and the switched packets are passed up to security plane 64 for processing according to a security policy associated with the incoming and outgoing L2 INTs 68.

Security device 50 also routes packets between L3 INTs 67 through L3 routing plane 65, and the routed packets are passed up to security plane 64 for based on a security policy associated with the incoming and outgoing L3 INTs 67. In addition, security device 50 routes packets between L3 INTs 67 and L2 INTs 68 through L3 routing plane 65 and L2 switching plane 66 connected via pseudo L3 interface 71. In this case, the packets are also passed up to security plane 64 for processing based on a security policy associated with the incoming and outgoing L3 INTs 67 and L2 INTs 68. According to the techniques, packets passed between any of L2 INTs 68 and L3 INTs 67 are switched and/or routed by security device 50 and security controlled via security plane 64.

Figure 6:
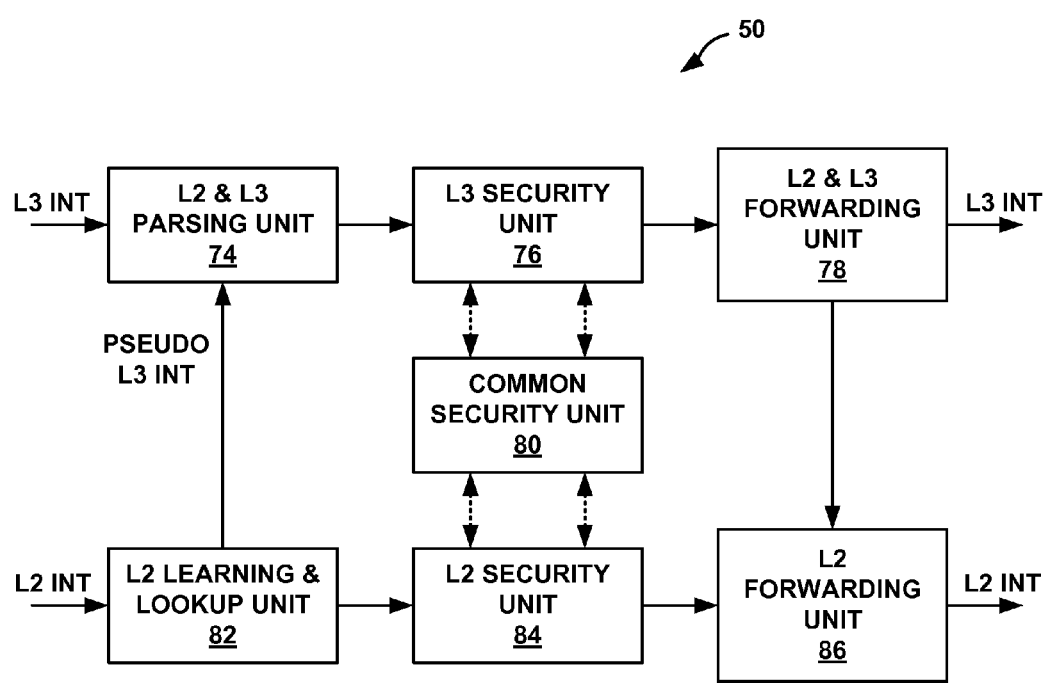
FIG. 6 is a logical diagram illustrating a packet flow between L2 interfaces and/or L3 interfaces in the integrated switching and routing security device.

FIG. 6 is a logical diagram illustrating a packet flow between L2 interfaces and/or L3 interfaces in integrated switching and routing security device 50. In general, FIG. 6 illustrates different operational units within security device 50 with respect to application of security policies to packets passing through security device 50. For example, L2 and L3 parsing unit 74, L2 and L3 forwarding unit 78, L2 learning and lookup unit 82 and L2 forwarding unit 86 may be included within a forwarding plane of security device 50. In addition, L3 security unit 76, common security unit 80, and L2 security unit 84 may be included in a security plane of security device 84.

The operational units of security device 50 may be used to provide end-to-end security to packets passed between L2 interfaces, between L3 interfaces, and between L2 and L3 interfaces. In the example of passing packets between L2 interfaces within the same L2 domain, L2 learning and lookup unit 82 receives an incoming packet from one of the L2 interfaces. L2 learning and lookup unit 82 identifies the incoming interface as an L2 interface and determines a destination address, e.g., a destination MAC address, for the received packet. When the destination MAC address is a network device associated with a L2 interface within the same L2 domain as the incoming interface, L2 learning and lookup will also determine the outgoing interface as the L2 interface associated with the destination MAC address.

L2 security unit 84 determines an L2 input security zone associated with the incoming interface for the packet and determines an L2 output security zone associated with the outgoing interface for the packet. L2 security unit 84 applies security policies to the packet based on the input and output security zones. For example, the L2 input and output security zones respectively associated with the specific pair of incoming and outgoing interfaces for the packet may be used to identify the security policies to apply to the packet. L2 security unit 84 then processes the packet based on the identified security policies. For example, L2 security unit 84 and/or common security unit 80 may perform security policy checking to determine whether the packet is permitted to pass between the incoming and outgoing L2 interfaces. If the security policy permits the packet, then L2 forwarding unit 86 forwards the packet on the L2 interface identified as the outgoing interface for the packet.

In the example of passing packets between L3 interfaces, L2 and L3 parsing unit 74 receives an incoming packet from one of the L3 interfaces. L2 and L3 parsing unit 74 identifies the incoming interface as an L3 interface. L3 security unit 76 performs an L3 lookup process to determine the outgoing interface as one of the L3 interfaces associated with a next hop for the packet. L3 security unit 76 then determines an L3 input security zone associated with the incoming interface for the packet and determines an L3 output security zone associated with the outgoing interface for the packet.

L3 security unit 76 applies security policies to the packet based on the input and output security zones. For example, the L3 input and output security zones respectively associated with the specific pair of incoming and outgoing interfaces for the packet may be used to identify the security policies to apply to the packet. L3 security unit 76 then processes the packet based on the identified security policies. For example, L3 security unit 76 and/or common security unit 80 may perform security policy checking to determine whether the packet is permitted to pass between the incoming and outgoing L3 interfaces. If the security policy permits the packet, then L2 and L3 forwarding unit 78 forwards the packet on the L3 interface identified as the outgoing interface for the packet.

In the example of passing packets from a L3 interface to a L2 interface, L2 and L3 parsing unit 74 receives an incoming packet from one of the L3 interfaces. L2 and L3 parsing unit 74 identifies the incoming interface as an L3 interface. L3 security unit 76 performs an L3 lookup process to determine the outgoing interface as one of the L2 interfaces associated with a next hop for the packet. L3 security unit 76 then determines an L3 input security zone associated with the incoming L3 interface for the packet and determines an L2 output security zone associated with the outgoing L2 interface for the packet. L3 security unit 76 applies security policies to the packet based on the input and output security zones. If the security policy permits the packet, then L2 and L3 forwarding unit 78 sends the packet to L2 forwarding unit 86. L2 forwarding unit 86 then forwards the packet on the L2 interface identified as the outgoing interface for the packet.

In the example of passing packets from a L2 interface to a L3 interface or to an L2 interface within a different L2 domain, L2 learning and lookup unit 82 receives an incoming packet from one of the L2 interfaces. L2 learning and lookup unit 82 identifies the incoming interface as an L2 interface and determines a destination address, e.g., a destination MAC address, for the received packet. When the destination MAC address is a pseudo L3 interface, L2 learning and lookup unit 82 sends the received packet to L2 and L3 parsing unit 74 via the pseudo L3 interface. L2 and L3 parsing unit 74 identifies the pseudo L3 interface as a route input interface because L3 features, such as NAT and IPSec VPN, are configured on the pseudo L3 interface and not on the L2 interface.

L3 security unit 76 then determines an outgoing interface for the packet as either a L3 interface or a L2 interface associated with a next hop for the packet using an L3 lookup process. L3 security unit 76 determines an L2 input security zone associated with the incoming L2 interface for the packet. When the outgoing interface is a L3 interface, L3 security unit 76 determines an L3 output security zone associated with the outgoing L3 interface for the packet. L3 security unit 76 applies security policies to the packet based on the input and output security zones. If the security policy permits the packet, then L2 and L3 forwarding unit 78 forwards the packet on the L3 interface identified as the outgoing interface for the packet.

When the outgoing interface is a L2 interface, L3 security unit 76 determines an L2 output security zone associated with the outgoing L2 interface for the packet. L3 security unit 76 applies security policies to the packet based on the input and output security zones. If the security policy permits the packet, then L2 and L3 forwarding unit 78 sends the packet to L2 forwarding unit 86. L2 forwarding unit 86 then forwards the packet on the L2 interface identified as the outgoing interface for the packet.

Figure 7:
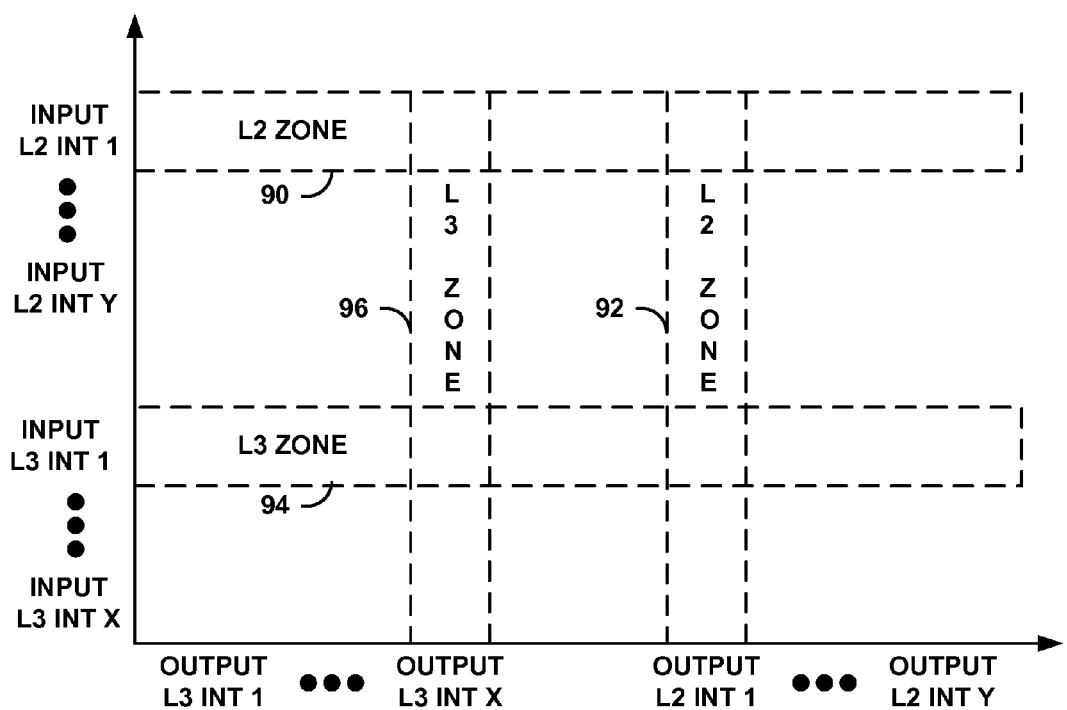
FIG. 7 is a chart illustrating an example configuration of L2 and L3 security zones respectively associated with L2 and L3 interfaces of the integrated switching and routing security device.

FIG. 7 is a chart illustrating an example configuration of L2 security zones 90, 92 and L3 security zones 94, 96 respectively associated with L2 and L3 interfaces of an integrated switching and routing security device, such as security device 50. In the chart of FIG. 7, the vertical axis represents all of the input L2 and L3 interfaces of security device 50, including X input L3 interfaces, e.g., any of L3 interfaces 60, 61 of FIG. 4, and Y input L2 interfaces, e.g., any of L2 interfaces 56, 57 of FIG. 4. The horizontal axis represents all of the output L2 and L3 interfaces of security device 50, including X output L3 interfaces, e.g., any of L3 interfaces 60, 61 of FIG. 4, and Y output L2 interfaces, e.g., any of L2 interfaces 56, 57 of FIG. 4.

In this example, security device 50 configures at least four distinct security zones: (1) an L2 input security zone 90 for all traffic received on input L2 interface 1, (2) an L2 output security zone 92 for all traffic output on output L2 interface 1, (3) an L3 input security zone 94 for all traffic received on input L3 interface 1, and (4) an L3 output security zone 96 for all traffic output on output L3 interface X. Security device 50 may configure the security zones based on configuration information received from a service provider system administrator via a user interface. For example, the system administrator may provide configuration information defining separate L2 and L3 security zones, and specifying one or more L2 interfaces associated with each of the L2 security zones and specifying one or more L3 interfaces associated with each of the L3 security zones.

In addition, the system administrator may define security policies to be applied with respect to the security zones. For example, each security policy may be defined with respect to a specific input security zone and a specific output security zone. The defined security policies specify one or more actions to be applied to the packets received on an input interface associated with the specific input security zone for output on an output interface associated with the specific output security zone. As an example, security policies may be defined with respect to L2 input security zone 90 and L2 output security zone 92, L2 input security zone 90 and L3 output security zone 96, L3 input security zone 94 and L2 output security zone 92, and L3 input security zone 94 and L3 output security zone 96.

The user interface may support a command syntax that allows the actual L2 interfaces of L2 bridge domains 54 within security device 50 to be used in conjunction with L3 interfaces of L3 routing instance 52 within security device 50 to define zones and corresponding security polices to be applied by security device 50 to those zones. As explained herein, security device 50 maintains L2 switching information and L3 routing information to allow security device 50 to apply zone-based security services to customer traffic associated with L2 interfaces and L3 interface, thereby providing a security device with end-to-end security between its actual interfaces.

Security device 50 then applies the actions enumerated in the security policy to received packets based on the security zones associated with the input and output interfaces for the packets. Example actions including packet filtering, packet logging, IDP, virus scanning, VPN, NAT, ALG, deep packet inspection, policy-based authentication, and the like.

Figure 8:
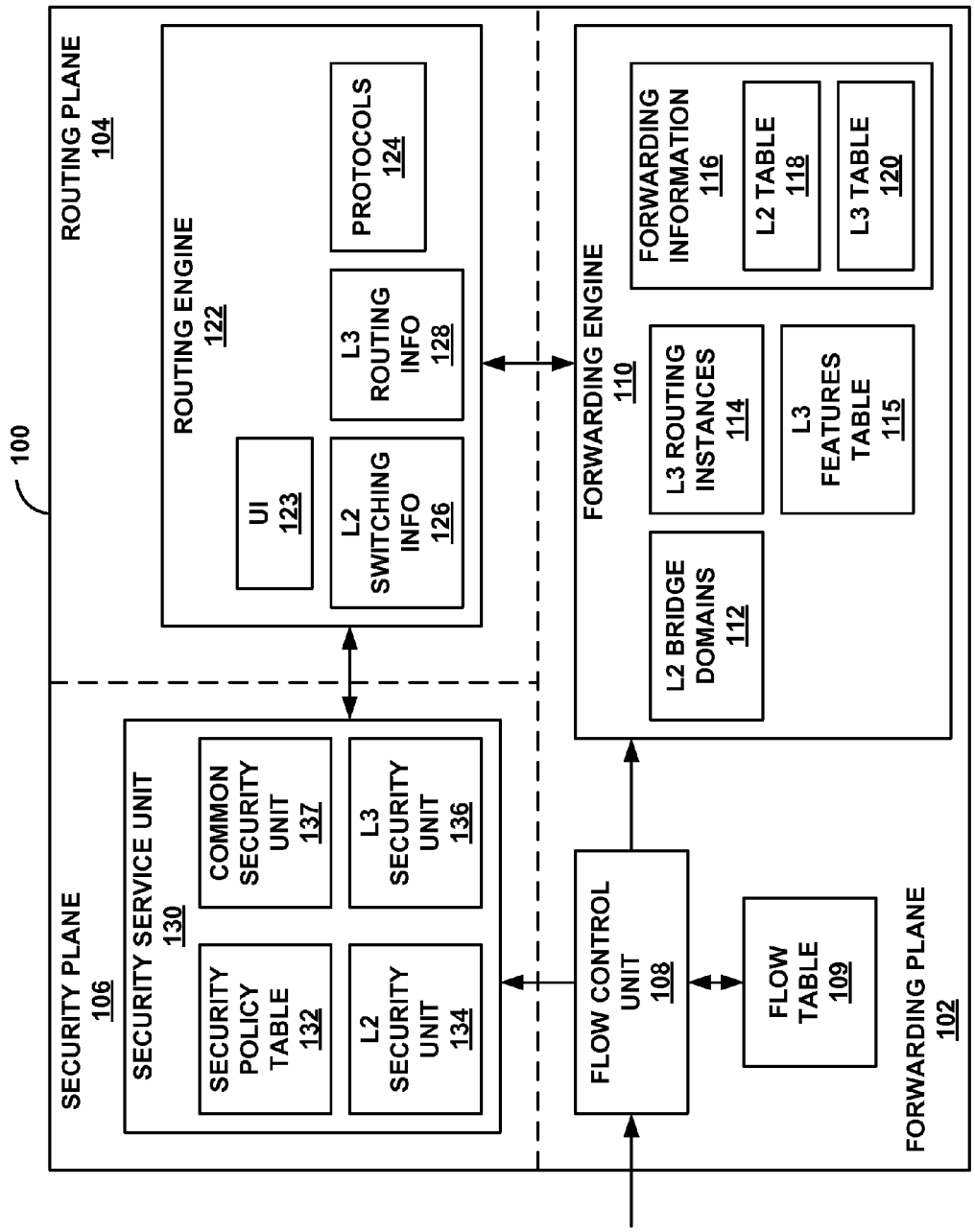
FIG. 8 is a logical diagram illustrating an example integrated switching and routing security device that integrates a routing engine and a security service unit using a shared forwarding plane.

FIG. 8 is a logical diagram illustrating an example integrated switching and routing security device 100 that integrates a routing plane 104 and a security plane 106 using a shared forwarding plane 102. Security device 100 may operate substantially similar to integrated switching and routing security device 12 from FIG. 1 and integrated switching and routing security device 50 as described in FIGS. 4-6.

Security device 100 may, for example, comprise an integrated L2 switch and L3 router capable of deployment within a service provider network, such as service provider network 12 from FIG. 1. As illustrated in FIG. 8, security device 100 is logically divided into three planes, forwarding plane 102, routing plane 104 and security plane 106. Routing plane 104 and security plane 106 utilize shared forwarding plane 102. Routing plane 104 and forwarding plane 102 operate as an L2 switch and/or an L3 router, and security plane 106 is tightly integrated within security device 100 (e.g., by way of service cards) so as to use forwarding plane 102 in a shared, cooperative manner. Further details of one example embodiment of the router functionality of security device 102 can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," which is incorporated herein by reference.

In some cases, forwarding plane 102 may be provided by dedicated forwarding integrated circuits normally associated with high-end routing and forwarding components of a network router. U.S. Pat. No. 8,050,559, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

As described above, security device 100 supports both L2 switching and L3 routing of packets with end-to-end security through security device 100. According to the techniques of this disclosure, routing plane 104 includes a routing engine 122 that is responsible for maintaining both L2 switching information 126 and L3 routing information 128. Routing engine 122 maintains L3 routing information 128 to reflect the current topology of a network and other L3 network devices to which security device 100 is connected. For example, routing engine 122 provides an operating environment for execution of routing protocols 124 that communicate with peer routers and periodically update L3 routing information 128 to accurately reflect the topology of the network and the other L3 network devices. Example protocols include routing and label switching protocols, such as BGP, ISIS, RSVP-TE and LDP, to establish VPNs and LSPs, and for exchanging labels.

In addition, routing engine 122 maintains L2 switching information 126 to reflect the network devices connected to each port of security device 100. For example, a forwarding engine 110 within forwarding plane 102 may initially broadcast packets to all L2 ports of security device 100 to provide L2 connectivity with network devices. Forwarding engine 110 may then learn of the network devices connected to the L2 ports and maintain state information to reflect this learning. For example, forwarding engine 110 may receive communications from the network devices and learn particular destination Media Access Control (MAC) addresses for the devices directly connected to each L2 port. Forwarding engine 110 stores the state information as L2 switching information 126 in routing engine 122.

In accordance with both L3 routing information 128 and L2 switching information 126, forwarding engine 110 maintains forwarding information 116. As illustrated in FIG. 8, forwarding information 116 includes L2 table 118 that associates MAC addresses of specific L2 network devices with corresponding interface ports of security device 100. Routing engine 122 processes L2 switching information 126 to generate L2 table 118. Forwarding information 116 also includes L3 table 120 that associates network destination labels with specific next hops and corresponding interface ports of security device 100. Routing engine 122 processes L3 routing information 128 to perform route selection and generate L3 table 120 based on selected routes and allocated network destination labels. In this way, routes as well as labeling information can be programmed into forwarding plane 102. Routing engine 122 may generate L3 table 120 within forwarding information 110 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Forwarding engine 110 also includes one or more L2 bridge domains 112 and one or more L3 routing instances 114. Each of L2 bridge domains 112 is connected to one or more network devices via one or more L2 interfaces. Security device 100 may switch packets between the L2 interfaces within the same one of L2 bridge domains 112, and, according to the techniques, apply security between the L2 interfaces within the same one of L2 bridge domains 112. L2 bridge domains 112 may operate substantially similar to L2 bridge domains 54 from FIG. 4.

Each of L3 routing instances 114 is connected to one or more L3 domains that include network devices via one or more L3 interfaces. In addition, each of L3 routing instances 114 is connected to one or more of L2 bridge domains 112 via pseudo L3 interfaces. Security device 100 may route packets between the L2 and/or L3 interfaces through L3 routing instances 114, and, according to the techniques, apply security end-to-end between the L2 and/or L3 interfaces. L3 routing instances 114 may operate substantially similar to L3 routing instance 52 from FIG. 4. In addition, forwarding engine 110 maintains L3 features table 115 that associates L3 security features with corresponding L3 interfaces and pseudo L3 interfaces connected to L3 routing instances 114. L3 features 115 may include NAT and IPSec VPN features for the L3 interfaces. The L3 security features designated for the L3 interfaces and pseudo L3 interfaces in L3 feature table 115 are performed in security plane 106.

In the illustrated example of FIG. 8, security plane 106 includes a security service unit 130 with both a L2 security unit 134 that processes packets passing through a single L2 bridge domain of security device 100, and a L3 security unit 136 that processes packets passing through a L3 routing instance of security device 100. L2 security unit 134 and L3 security unit 136 may operate substantially similar to L2 security unit 84 and L3 security unit 76, respectively, from FIG. 6. Security service unit 130 also includes a common security unit 137 that operates substantially similar to common security unit 137 from FIG. 6. In some cases, security service unit 130 may be implemented as a plurality of service cards (not shown), and routing engine 122 may program each of the service cards with corresponding configuration information. Each of the service cards may, for example, execute a microkernel that operates as a consumer of state information and listens for communications from routing engine 122.

Routing engine 122 includes a user interface (UI) module 123 to receive configuration information from a service provider defining L2 and L3 security zones and policies associated with the security zones with respect to the interfaces of security device 100. UI module 123 represents software executing on routing engine 122 that may present a command line interface or some other user input interface for receiving the configuration information from the service provider. In response, routing engine 122 programs security service unit 130 within security plane 106 with the corresponding configuration information so that security service unit 130 is capable of recognizing the defined security zones and applying the associated security policies when processing packets from forwarding plane 102. For example, security service unit 130 may store the security policies with respect to associated pairs of security zones in a security policy table 132. In one example, routing engine 122 may communicate with and program the plurality of service cards used to implement security service unit 130.

According to the techniques of this disclosure, routing engine 122 and security service unit 130 interact so that security service unit 130 is made aware of state information associated with the traffic flowing through the routing device. For example, routing engine 122 provides security service unit 130 with information maintained in both L2 switching information 126 and in L3 routing information 128. In this way, L2 security unit 134 and/or L3 security unit 136 determine security zones associated with the incoming and outgoing interfaces for the packets based on the state information. L2 security unit 134 and/or L3 security unit 136 then lookup security policies in security policy table 132 to apply to the received packets based on the determined security zones.

Forwarding plane 102 also includes a flow control unit 108 to selectively direct packets to security service unit 130 for processing. More specifically, flow control unit 108 receives incoming packet flows and determines whether to send the packets through security service unit 130 for processing within one of L2 security unit 134 and L3 security unit 136, or whether to bypass security service unit 130. For example, flow control unit 108 may include functional units that operate substantially similar to L2 and L3 parsing unit 74, L2 and L3 forwarding unit 78, L2 learning and lookup unit 82, and L2 forwarding unit 86 within security device 50 from FIG. 6.

As one example, when flow control unit 108 receives a packet with its L2 learning and lookup unit and determines that the incoming interface of the packet is an L2 interface connected to one of L2 bridge domains 112 and that the destination MAC address for the packet is within the same one of L2 bridge domains 112, flow control unit 108 sends the packet to L2 security unit 134 for processing. As another example, when flow control unit 108 receives a packet with its L2 learning and lookup unit and determines that the incoming interface of the packet is an L2 interface connected to one of L2 bridge domains 112 and that the destination MAC address for the packet is a pseudo L3 interface, flow control unit 108 sends the packet to L3 security unit 136 for processing.

In general, security service unit 130 receives packets from flow control unit 108, processes the packets with one of L2 security unit 134 and L3 security unit 136 in accordance with the defined security zones and security policies, and relays the packets back to forwarding plane 102. The secure packets are then forwarded by forwarding engine 110 in accordance with forwarding information 116. Security service unit 130 may perform a variety of security services on the packets received from forwarding plane 102, such as packet filtering, packet logging, IDP, virus scanning, VPN, NAT, ALG, deep packet inspection, policy-based authentication, and the like.

In some cases, security service unit 130 may issue commands to dynamically configure a flow table 109 associated with flow control unit 108 within forwarding plane 102. For example, when flow control unit 108 receives a packet and determines that the packet belongs to a new packet flow, flow control unit 108 may send the packet to one of L2 security unit 134 and L3 security unit 136 for processing. Upon receiving and processing the packet, security service unit 130 may issue a command to install a dynamic filter within flow table 109, such as an exact match filter that indicates particular actions to be performed when a packet is received that matches the filter. In the case where security service unit 130 determines that no further security services need be applied to a particular packet flow (e.g., after determining that the packet flow is trusted or benign), security service unit 130 may install a filter within flow table 109 to specify that subsequent packets of this packet flow session may be processed on a straight path that bypasses security service unit 130. When flow control unit 108 receives a subsequent packet of the same packet flow, flow control unit 108 checks flow table 109, determines that the packet matches the new dynamic filter, and directs the packet on the appropriate path according to the dynamic filter.

In some examples, routing engine 122 and forwarding engine 110 may be included within a control unit that receives and sends packets to a network environment through a plurality of interface cards via inbound and outbound communication links (not shown). In other examples, routing engine 122 may be included within a control unit and forwarding engine 110 may be distributed across a plurality of interface cards. In further examples, routing engine 122, forwarding engine 110 and security service unit 130 may be implemented in other ways.

In one example, each of forwarding engine 110 and routing engine 122 may comprise a wide variety of devices or apparatuses, including one or more dedicated processors, hardware, integrated circuit (IC), application-specific ICs (ASICs), or the like, and may be communicatively coupled by a data communication channel. The data communication channel may be a high-speed network connection, bus, shared-memory or other data communication mechanism. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Security device 100 may operate according to program code having executable instructions fetched from a computer-readable storage medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

Figure 9:
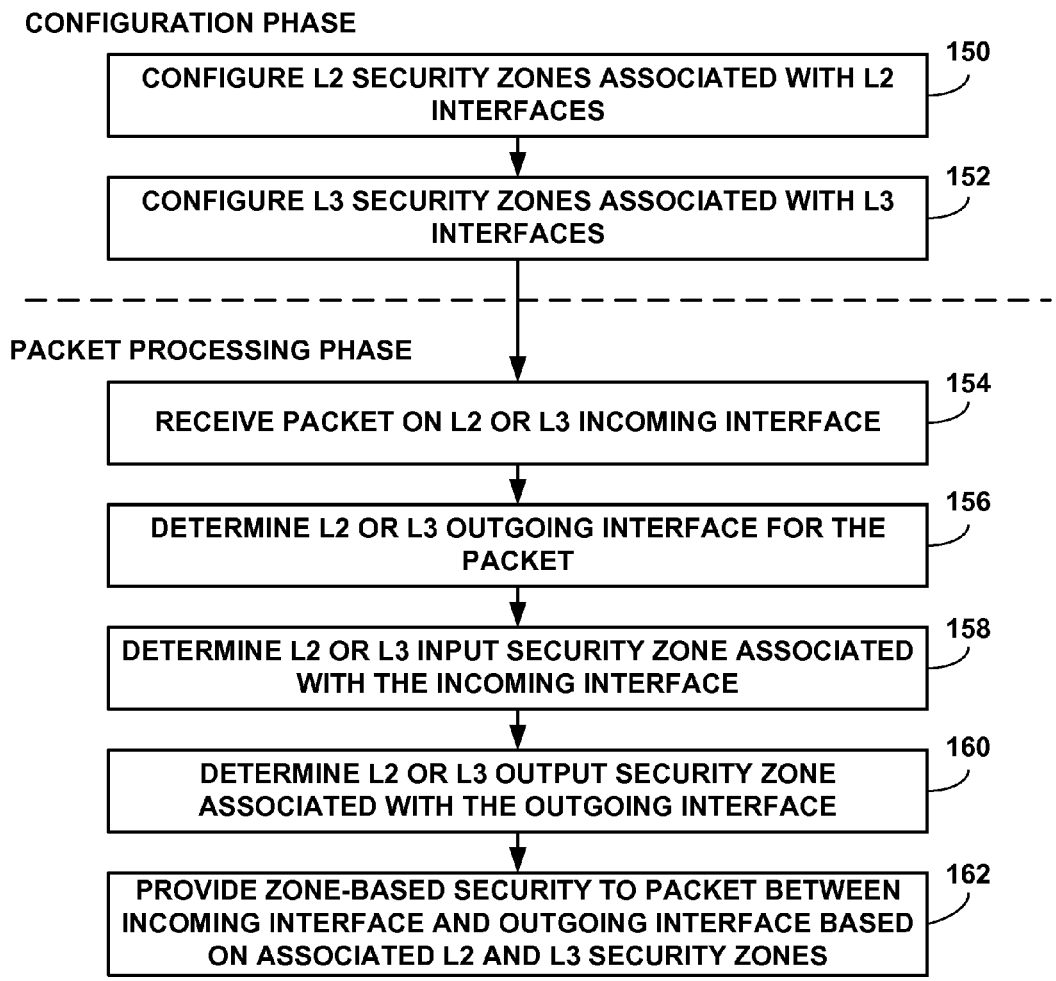
FIG. 9 is a flowchart illustrating an example operation of an integrated switching and routing security device in accordance with the principles of the invention.

FIG. 9 is a flowchart illustrating an example operation of an integrated switching and routing security device in accordance with the principles of the invention. For exemplary purposes, the flowchart of FIG. 9 will be explained in reference to security device 100 illustrated in FIG. 8.

During a configuration phase, security device 100 configures L2 security zones associated with one or more of L2 interfaces (150). According to the techniques of this disclosure, each of the L2 interfaces may be grouped into a separate security zone, because the security zones are configured on individual L2 interfaces and not on pseudo L3 interfaces associated with each of the L2 bridge domains. Security device 100 also configures L3 security zones associated with L3 interfaces (152). Routing engine 122 receives configuration information for the L2 security zones and the L3 security zones from a service provider via UI module 123, and communicates the configuration information to security service unit 130. In addition, routing engine 122 receives configuration information for security policies for one or more pairs of the L2 and L3 security zones associated with the L2 and L3 interfaces between which packets may be passed, i.e., incoming and outgoing interfaces. Security service unit 130 may store the configured security policies with respect to the L2 and L3 security zones in security policy table 132.

During a packet processing phase, security device 100 receives a packet on one of an L2 incoming interface and an L3 incoming interface (154). Security device 100 passes the received packet from forwarding plane 102 to security service unit 130 within security plane 106 for processing. More specifically, flow control unit 108 sends the received packet to one of L2 security unit 134 and L3 security unit 136 within security service unit 130 based on the incoming interface and destination MAC address of the received packet.

Security service unit 130 determines an outgoing interface for the packet to be one of an L2 outgoing interface and an L3 outgoing interface (156). As described above, security service unit 130 may perform an L3 lookup to determine the outgoing interface for the packet based on L3 routing information 128, maintained by routing engine 122. Security service unit 130 then determines the L2 or L3 input security zone associated with the incoming interface for the packet based on the configuration information (158). Similarly, security service unit 130 also determines the L2 or L3 output security zone associated with the outgoing interface for the packet based on the configuration information (160).

Security service unit 130 provides end-to-end security to the received packet between the L2 or L3 incoming interface and the L2 or L3 outgoing interface for the packet based on the associated L2 and L3 security zones (162). As described above, security service unit 130 may perform a lookup process in security policy table 132 to retrieve security policies configured for the pair of input and output security zones associated with the incoming and outgoing interfaces for the packet.

The techniques of configuring security zones on L2 interfaces provide end-to-end security in security device 100. The techniques of configuring security zones on L2 interfaces also provide improved security granularity in security device 100 by enabling each of the L2 interfaces to be grouped into a separate security zone.

Figure 10:
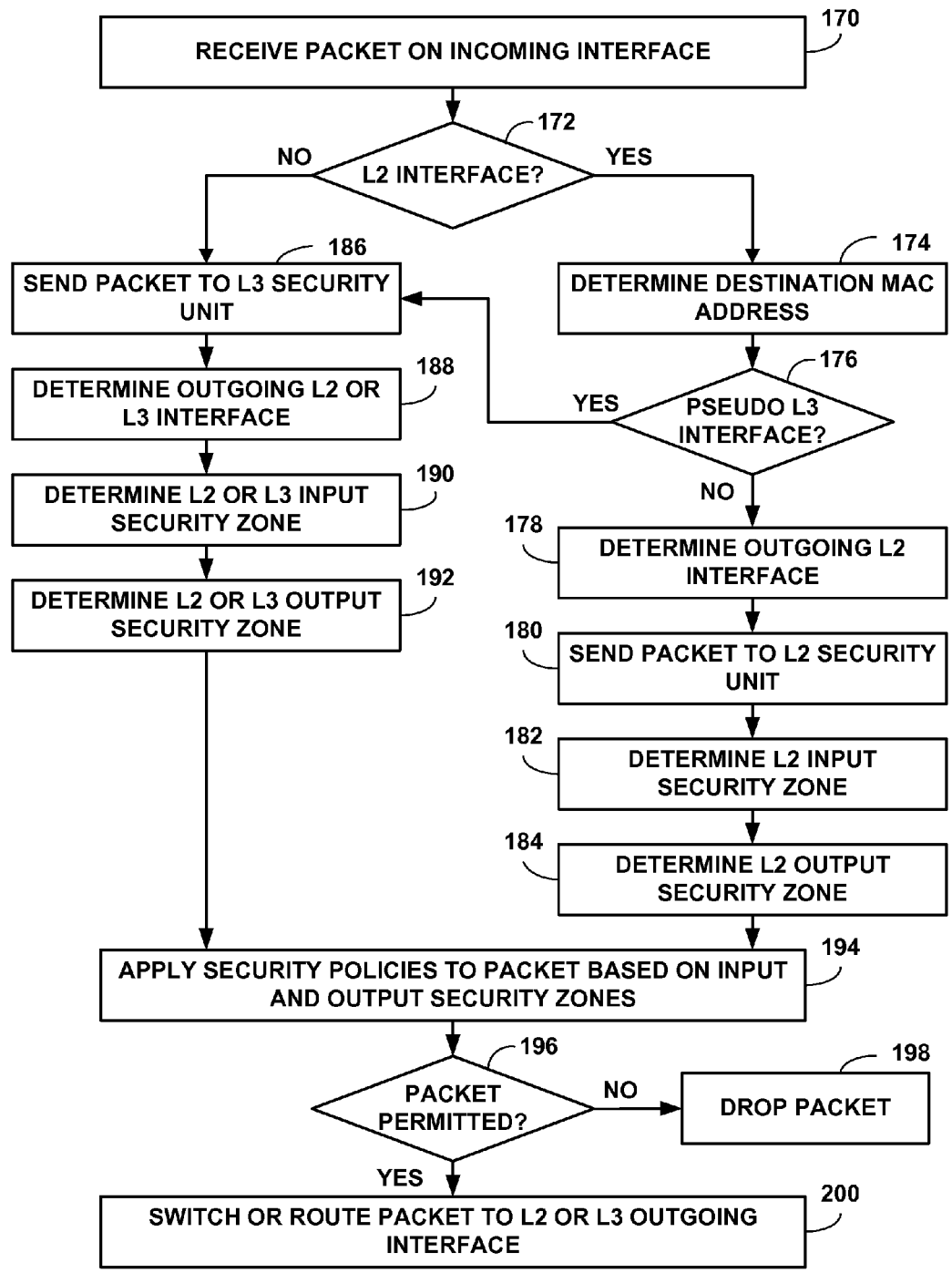
FIG. 10 is a flowchart further illustrating example operation of the integrated switching and routing security device of FIG. 8.

FIG. 10 is a flowchart further illustrating example operation of the integrated switching and routing security device 100 of FIG. 8. Security device 100 receives a packet on an incoming interface (170). Flow control unit 108 within forwarding plane 102 may identify the incoming interface as either an L2 interface or an L3 interface (172). For example, security device 100 may first perform a learning and lookup process, such as performed by L2 learning and lookup unit 82 from FIG. 6, or a parsing process, such as performed by L2 and L3 parsing unit 74 from FIG. 6, to update the switching, routing and forwarding information for the network. Flow control unit 108 may then access forwarding information 116 in forwarding engine 110 in order to identify the incoming interface.

When flow control unit 108 identifies the incoming interface as an L2 interface (YES branch of 172), flow control unit 108 may also determine a destination MAC address for the received packet (174). When the destination MAC address is a network device associated with a L2 interface within the same L2 domain as the incoming interface (NO branch of 176), flow control unit 108 determines the outgoing L2 interface associated with the destination MAC address (178). Flow control unit 108 then sends the received packet to L2 security unit 134 based on the incoming L2 interface and the outgoing L2 interface being within the same L2 domain (180).

L2 security unit 134 determines an L2 input security zone associated with the incoming L2 interface for the packet (182). L2 security unit 134 also determines an L2 output security zone associated with the outgoing L2 interface for the packet (184). L2 security unit 134 may use the L2 input and output security zones respectively associated with the specific pair of incoming and outgoing interfaces for the packet to identify the security policies within security policy table 132 to apply to the packet. L2 security unit 134 then applies the security policies to the packet based on the input and output security zones (194).

When the packet is not permitted according to the applied security policy (NO branch of 196), forwarding engine 110 drops the packet (198). When the packet is permitted according to the applied security policy (YES branch of 196), forwarding engine 110 switches the packet from the incoming L2 interface to the outgoing L2 interface in the same L2 domain (200). The techniques of configuring security zones on individual L2 interfaces provide end-to-end security within each of L2 bridge domains 112 of security device 100.

When flow control unit 108 identifies the incoming interface as an L2 interface (YES branch of 172) and the destination MAC address is a pseudo L3 interface (YES branch of 176), flow control unit 108 sends the received packet to L3 security unit 136 based on the incoming L2 interface and the destination pseudo L3 interface (186). A packet received on an incoming L2 interface may indicate a pseudo L3 interface when the packet is to be passed through one of L3 routing instances 114 an outgoing L2 interface within a separate one of L2 bridge domains 112 or an outgoing L3 interface. L3 security unit 136 then determines an outgoing interface for the packet as one of an L2 interface or an L3 interface (188). L3 security unit 136 may perform an L3 lookup to determine the outgoing interface for the packet based on L3 routing information 128 maintained by routing engine 122.

L3 security unit 136 then determines an L2 input security zone associated with the incoming L2 interface for the packet (190). When the outgoing interface is an L2 interface, L3 security unit 136 determines an L2 output security zone associated with the outgoing L2 interface for the packet (192). On the other hand, when the outgoing interface is an L3 interface, L3 security unit 136 determines an L3 output security zone associated with the outgoing L3 interface for the packet (192). In either case, L3 security unit 136 may use the input and output security zones respectively associated with the specific pair of incoming and outgoing interfaces for the packet to identify the security policies within security policy table 132 to apply to the packet. L3 security unit 136 then applies the security policies to the packet based on the input and output security zones (194).

When the packet is not permitted according to the applied security policy (NO branch of 196), forwarding engine 110 drops the packet (198). When the packet is permitted according to the applied security policy (YES branch of 196), forwarding engine 110 switches the packet from the incoming L2 interface to the outgoing L2 interface in a different L2 domain or the outgoing L3 interface (200). The techniques of configuring security zones on L2 interfaces provide end-to-end security between L2 interfaces within different ones of L2 bridge domains 112, and between an L2 interface and an L3 interface of security device 100.

When flow control unit 108 identifies the incoming interface as an L3 interface (NO branch of 172), flow control unit 108 sends the received packet to L3 security unit 136 based on the incoming L3 interface (186). L3 security unit 136 then determines an outgoing interface for the packet as one of an L2 interface and a L3 interface (188). L3 security unit 136 may perform an L3 lookup to determine the outgoing interface for the packet based on L3 routing information 128 maintained by routing engine 122.

L3 security unit 136 then determines an L3 input security zone associated with the incoming L3 interface for the packet (190). When the outgoing interface is an L2 interface, L3 security unit 136 determines an L2 output security zone associated with the outgoing L2 interface for the packet (192). On the other hand, when the outgoing interface is an L3 interface, L3 security unit 136 determines an L3 output security zone associated with the outgoing L3 interface for the packet (192). In either case, L3 security unit 136 may use the input and output security zones respectively associated with the specific pair of incoming and outgoing interfaces for the packet to identify the security policies within security policy table 132 to apply to the packet. L3 security unit 136 then applies the security policies to the packet based on the input and output security zones (194).

When the packet is not permitted according to the applied security policy (NO branch of 196), forwarding engine 110 drops the packet (198). When the packet is permitted according to the applied security policy (YES branch of 196), forwarding engine 110 switches the packet from the incoming L3 interface to the outgoing L2 interface or the outgoing L3 interface (200). The techniques of configuring security zones on L2 interfaces provide end-to-end security between an L3 interface and an L2 interface of security device 100.

Various examples of the invention have been described. These and other examples are within the scope of the following claims.

The invention claimed is:

1. A method comprising:
receiving packets on a plurality of interfaces of a security device, wherein the interfaces include one or more layer two (L2) interfaces and one or more layer three (L3) interfaces;
configuring L2 security zones associated with one or more of the L2 interfaces of the security device, wherein the L2 interfaces comprise one or more L2 bridge domains within the security device;
configuring L3 security zones associated with one or more of the L3 interfaces of the security device, wherein the L3 interfaces are associated with at least one L3 routing instance within the security device; and
based on the security zones associated with an incoming interface and an outgoing interface for each of the packets, providing zone-based security within the security device when forwarding the packets directly between two of the L2 interfaces of a same one of the L2 bridge domains, when forwarding the packets between two of the L2 interfaces of different ones of the L2 bridge domains, when forwarding the packets between one of the L2 interfaces of one of the L2 bridge domains and one of the L3 interfaces of the L3 routing instance, and when forwarding the packets between two of the L3 interfaces of the L3 routing instance.

2. The method of claim 1, wherein configuring L2 security zones comprises configuring L2 security zones associated with the L2 interfaces of one of the L2 bridge domains within the security device without configuring security zones for an internal pseudo L3 interface associated with the L2 bridge domain.

3. The method of claim 1, further comprising:
receiving a packet on an incoming one of the plurality of interfaces of the security device;
applying security policies to the packet based on one of the L2 and L3 security zones associated with the incoming interface for the packet, and one of the L2 and L3 security zones associated with an outgoing interface for the packet; and
when the security policies permit the packet, at least one of routing or switching the packet to the outgoing interface.

4. The method of claim 1, wherein providing zone-based security within the security device when forwarding the packets directly between two of the L2 interfaces of the same one of the L2 bridge domains comprises:
- identifying the incoming interface for one of the packets as one of the L2 interfaces of one of the L2 bridge domains within the security device;
- determining a destination media access control (MAC) address of the packet;
- when the destination MAC address comprises a network device, sending the packet to an L2 security unit;
- determining the outgoing interface for the packet as one of the L2 interfaces of the same one of the L2 bridge domains within the security device; and
- applying security policies based on the L2 security zones associated with the incoming and outgoing L2 interfaces.

5. The method of claim 1, wherein providing zone-based security within the security device when forwarding the packets between two of the L2 interfaces of different ones of the L2 bridge domains comprises:
- identifying the incoming interface for one of the packets as one of the L2 interfaces of one of the L2 bridge domains within the security device;
- determining a destination media access control (MAC) address of the packet;
- when the destination MAC address comprises an internal pseudo L3 interface associated with the L2 bridge domain of the incoming L2 interface, sending the packet to an L3 security unit;
- determining the output interface for the packet as one of the L2 interfaces of a different one of the L2 bridge domains within the security device; and
- applying security policies based on the L2 security zones associated with the incoming and outgoing L2 interfaces.

6. The method of claim 1, wherein providing zone-based security within the security device when forwarding the packets between one of the L2 interfaces of one of the L2 bridge domains and one of the L3 interfaces of the L3 routing instance comprises:
- identifying the incoming interface for one of the packets as one of the L2 interfaces of one of the L2 bridge domains within the security device;
- determining a destination media access control (MAC) address of the packet;
- if the destination MAC address comprises an internal pseudo L3 interface associated with the L2 bridge domain of the incoming L2 interface, sending the packet to an L3 security unit;
- determining the output interface for the packet as one of the L3 interfaces of the L3 routing instance within the security device; and
- applying security policies based on the L2 security zone associated with the incoming L2 interface and the L3 security zone associated with the outgoing L3 interface.

7. The method of claim 1, wherein providing zone-based security within the security device when forwarding the packets between two of the L3 interfaces of the L3 routing instance comprises:
- identifying the incoming interface for one of the packets as one of the L3 interfaces of the L3 routing instance within the security device;
- sending the packet to an L3 security unit;
- determining the output interface for the packet as one of the L3 interfaces of the L3 routing instance within the security device; and
- applying security policies based on the L3 security zones associated with the incoming and outgoing L3 interfaces.

8. The method of claim 1, wherein providing zone-based security within the security device when forwarding the packets between one of the L2 interfaces of one of the L2 bridge domains and one of the L3 interfaces of the L3 routing instance comprises:
- identifying the incoming interface for one of the packets as one of the L3 interfaces of the L3 routing instance within the security device;
- sending the packet to an L3 security unit;
- determining the output interface for the packet as one of the L2 interfaces of one of the L2 bridge domains within the security device; and
- applying security policies based on the L3 security zone associated with the incoming L3 interface and the L2 security zone associated with the outgoing L2 interface.

9. The method of claim 1, further comprising:
- determining an input security zone associated with the incoming interface for each of the packets; and
- determining an output security zone associated with the outgoing interface for each of the packets, wherein providing zone-based security to the packets comprises applying security policies to each of the packets based on both the input security zone and the output security zone.

10. The method of claim 1, further comprising one of:
- routing the packets between the two of the L3 interfaces of the L3 routing instance within the security device;
- switching the packets between the two of the L2 interfaces of a single the same one of the L2 bridge domains within the security device;
- routing the packets between the one of the L2 interfaces of the one of the L2 bridge domains and the one of the L3 interfaces of the L3 routing instance within the security device; or
- routing the packets between the two of the L2 interfaces of the different ones of the L2 bridge domains within the security device, wherein each of the L2 bridge domains are connected to the L3 routing instance via an internal pseudo L3 interface.

11. The method of claim 1, further comprising storing security policies with respect to one or more pairs of the L2 and L3 security zones associated with the L2 and L3 interfaces.

12. The method of claim 1,
- wherein configuring L2 security zones comprises receiving configuration information via a user interface that specifies one or more of the L2 interfaces to be grouped into each of the L2 security zones; and
- wherein configuring L3 security zones comprises receiving configuration information via a user interface that specifies one or more of the L3 interfaces to be grouped into each of the L3 security zones.

13. The method of claim 1, further comprising determining the L2 and L3 security zones associated with the incoming and outgoing interfaces for each of the packets based on at least one of L2 switching information and L3 routing information maintained by a routing engine.

14. The method of claim 13, wherein the L2 switching information and the L3 routing information is communicated to a security service unit that applies security policies associated with the security zones to each of the packets, and communicated to a forwarding engine to generate forwarding information.

15. A security device comprising one or more hardware-based processors configured to operate as:
- a plurality of interfaces to send and receive packets, wherein the interfaces include one or more layer two (L2) interfaces and one or more layer three (L3) interfaces;
- a control unit to configure L2 security zones associated with one or more of the L2 interfaces and configure L3 security zones associated with one or more of the L3 interfaces, wherein the L2 interfaces comprise one or more L2 bridge domains within the security device, and wherein the L3 interfaces are associated with at least one L3 routing instance within the security device; and
- based on the security zones associated with an incoming interface and an outgoing interface for each of the packets, a security service unit to provide zone-based security within the security device when forwarding the packets directly between two of the L2 interfaces of a same one of the L2 bridge domains, when forwarding the packets between two of the L2 interfaces of different ones of the L2 bridge domains, when forwarding the packets between one of the L2 interfaces of one of the L2 bridge domains and one of the L3 interfaces of the L3 routing instance, and when forwarding the packets between two of the L3 interfaces of the L3 routing instance.

16. The security device of claim 15, wherein the control unit configures L2 security zones associated with the L2 interfaces of one of the L2 bridge domains within the security device without configuring security zones for an internal pseudo L3 interface associated with the L2 bridge domain.

17. The security device of claim 15,
- wherein an incoming one of the plurality of interfaces receives a packet;
- wherein the security service unit applies security policies to the packet based on one of the L2 and L3 security zones associated with the incoming interface for the packet, and one of the L2 and L3 security zones associated with an outgoing interface for the packet; and
- wherein, when the security policies permit the packet, the control unit at least one of routes or switches the packet to the outgoing interface.

18. The security device of claim 17, wherein the security service unit includes an L2 security unit and an L3 security unit, and wherein the security service unit applies the security policies with one of the L2 security unit and the L3 security unit based on the incoming and outgoing interfaces for the packets.

19. The security device of claim 15, wherein, to provide zone-based security within the security device when forwarding the packets directly between two of the L2 interfaces of the same one of the L2 bridge domains:
- the control unit is configured to identify the incoming interface for one of the packets as one of the L2 interfaces of one of the L2 bridge domains within the security device, determine a destination media access control (MAC) address of the packet, and, if the destination MAC address comprises a network device, send the packet to an L2 security unit in the security service unit; and
- the security service unit is configured to determine the outgoing interface for the packet as one of the L2 interfaces of the same one of the L2 bridge domains within the security device, and apply security policies based on the L2 security zones associated with the incoming and outgoing L2 interfaces.

20. The security device of claim 15, wherein, to provide zone-based security within the security device when forwarding the packets between two of the L2 interfaces of different ones of the L2 bridge domains:
- the control unit is configured to identify the incoming interface for one of the packets as one of the L2 interfaces of one of the L2 bridge domains within the security device, determine a destination media access control (MAC) address of the packet, and, if the destination MAC address comprises a pseudo L3 interface, send the packet to an L3 security unit in the security service unit; and
- the security service unit is configured to determine the output interface for the packet as one of the L2 interfaces of a different one of the L2 bridge domains within the security device, and apply security policies based on the L2 security zones associated with the incoming and outgoing L2 interfaces.

21. The security device of claim 15, wherein, to provide zone-based security within the security device when forwarding the packets between one of the L2 interfaces of one of the L2 bridge domains and one of the L3 interfaces of the L3 routing instance:
- the control unit is configured to identify the incoming interface for one of the packets as one of the L2 interfaces of one of the L2 bridge domains within the security device, determine a destination media access control (MAC) address of the packet, and, if the destination MAC address comprises a pseudo L3 interface, send the packet to an L3 security unit in the security service unit; and
- the security service unit is configured to determine the output interface for the packet as one of the L3 interfaces of the L3 routing instance within the security device, and apply security policies based on the L2 security zone associated with the incoming L2 interface and the L3 security zone associated with the outgoing L3 interface.

22. The security device of claim 15, wherein, to provide zone-based security within the security device when forwarding the packets between two of the L3 interfaces of the L3 routing instance:
- the control unit is configured to identify the incoming interface for one of the packets as one of the L3 interfaces of the L3 routing instance within the security device, and send the packet to an L3 security unit in the security service unit; and
- the security service unit is configured to determine the output interface for the packet as one of the L3 interfaces of the L3 routing instance within the security device, and apply security policies based on the L3 security zones associated with the incoming and outgoing L3 interfaces.

23. The security device of claim 15, wherein, to provide zone-based security within the security device when forwarding the packets between one of the L2 interfaces of one of the L2 bridge domains and one of the L3 interfaces of the L3 routing instance:
- the control unit is configured to identify the incoming interface for one of the packets as one of the L3 interfaces of the L3 routing instance within the security device, and send the packet to an L3 security unit in the security service unit; and
- the security service unit is configured to determine the output interface for the packet as one of the L2 interfaces of one of the L2 bridge domains within the security device, and apply security policies based on the L3 security zone associated with the incoming L3 interface and the L2 security zone associated with the outgoing L2 interface.

24. The security device of claim 15, wherein the security service unit is configured to:
   determine an input security zone associated with the incoming interface for each of the packets;
   determine an output security zone associated with the outgoing interface for each the packets; and
   applying security policies to each of the packets based on both the input security zone and the output security zone.

25. The security device of claim 15, wherein the control unit at least one of:
   routes the packets between the two of the L3 interfaces of the L3 routing instance within the security device;
   switches the packets between the two of the L2 interfaces of a single one of the L2 bridge domains within the security device;
   routes the packets between the one of the L2 interfaces of the one of the L2 bridge domains and the one of the L3 interfaces of the L3 routing instance within the security device; or
   routes the packets between the two of the L2 interfaces of the different ones of the L2 bridge domains within the security device, wherein each of the L2 bridge domains are connected to the L3 routing instance via an internal pseudo L3 interface.

26. The security device of claim 15, further comprising a security policy table to store security policies with respect to one or more pairs of the L2 and L3 security zones associated with the L2 and L3 interfaces.

27. The security device of claim 15, further comprising a user interface to receive configuration information that specifies one or more of the L2 interfaces to be grouped into each of the L2 security zones, and receive configuration information that specifies one or more of the L3 interfaces to be grouped into each of the L3 security zones.

28. The security device of claim 15, wherein the security service unit determines the L2 and L3 security zones associated with the incoming and outgoing interfaces for the packets based on at least one of L2 switching information or L3 routing information maintained by a routing engine within the control unit.

29. The security device of claim 28, wherein the routing engine communicates the L2 switching information and the L3 routing information to the security service unit and to a forwarding engine within the control unit to generate forwarding information.

30. A computer-readable storage medium comprising program instructions to cause a processor to:
   receive packets on a plurality of interfaces of a security device, wherein the interfaces include one or more layer two (L2) interfaces and one or more layer three (L3) interfaces;
   configure L2 security zones associated with one or more of the L2 interfaces of the security device, wherein the L2 interfaces comprise one or more L2 bridge domains within the security device;
   configure L3 security zones associated with one or more of the L3 interfaces of the security device, wherein the L3 interfaces are associated with at least one L3 routing instance within the security device; and
   based on the security zones associated with an incoming interface and an outgoing interface for each of the packets, provide zone-based security within the security device when forwarding the packets directly between two of the L2 interfaces of a same one of the L2 bridge domains, when forwarding the packets between two of the L2 interfaces of different ones of the L2 bridge domains, when forwarding the packets between one of the L2 interfaces of one of the L2 bridge domains and one of the L3 interfaces of the L3 routing instance, and when forwarding the packets between two of the L3 interfaces of the L3 routing instance.

* * * * *